Patented Mar. 6, 1951

2,543,952

UNITED STATES PATENT OFFICE 2,543,952

DIALLYL ETHER DICHLOROHYDRINS

Owen Clement Wentworth Allenby, McMasterville, Quebec, Canada, assignor to Canadian Industries Limited, Montreal, Quebec, Canada, a corporation of Quebec, Canada No Drawing. Application March 5, 1948, Serial No. 13,334. In Canada August 8, 1947

1 Claim. (Cl. 260—615)

This invention relates to new compositions of matter, and, more particularly, diallyl ether dichlorohydrins, and to a method for their preparation.

In United States Patent No. 2,314,039, there is disclosed diallyl ether monochlorohydrin together with a method for its preparation which comprises reacting epichlorohydrin with allyl alcohol in the presence of boron trifluoride as a catalyst. The monochlorhydrin thus obtained has the following formula:

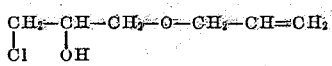

Diallyl ether can also be reacted with hypochlorous acid to prepare the same compound, in which case two isomers may be obtained having the formula:

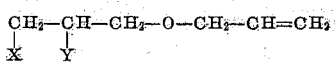

wherein X and Y may be chlorine and hydroxyl, X being chlorine when Y is hydroxyl and Y being chlorine when X is hydroxyl.

It is an object of this invention to provide new addition products of diallyl ether monochlorohydrins. Another object is the provision of diallyl ether dichlorohydrins, said dichlorohydrins being new and useful compounds. A further object is the preparation of diallyl ether dichlorohydrins. Other objects will appear hereinafter.

These objects are accomplished by reacting diallyl ether monochlorohydrins with hypochlorous acid.

In a more specific embodiment, this invention comprises reacting a dispersion of diallyl ether monochlorohydrins in a dilute mineral acid, such as sulphuric acid, with an aqueous solution of a hypochlorite, said hypochlorite solution being added slowly to the diallyl ether monochlorohydrins acid dispersion. The hypochlorous acid liberated by the interaction of the mineral acid and the hypochlorite reacts with the diallyl ether monochlorohydrins to form the dichlorohydrins. An alternative procedure is to react a dispersion of diallyl ether monochlorohydrins in a hypochlorite with a strong mineral acid. The diallyl ether dichlorohydrins produced by the foregoing methods may be isolated by extraction with a solvent, followed by removal of the solvent by distillation. They have the general formula

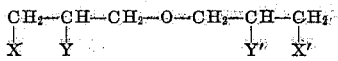

wherein X and Y, and X' and Y' are interchangeably chlorine and hydroxyl, X and X' being chlorine when Y and Y' are hydroxyl and Y and Y' being chlorine when X and X' are hydroxyl.

The following examples are illustrative of the more detailed practice of this invention:

Example 1

48 grams of diallyl ether monochlorohydrin, prepared by reacting epichlorohydrin with allyl alcohol, was placed in a 5-liter flask containing 1000 milliliters of a sodium hypochlorite solution. The latter was prepared by adding 27.5 grams of chlorine slowly at 2° C. to 1000 milliliters of water containing 31 grams of sodium hydroxide. To the stirred mixture of sodium hypochlorite and diallyl ether monochlorohydrin, 200 milliliters of water containing 11 grams of 95.5% sulphuric acid was added at 10° C. over a period of 20 minutes. The excess hypochlorite was destroyed with sodium sulphite. A total of 16.8 grams of hypochlorous acid was shown to have been taken up by addition to the double bond in the diallyl ether monochlorohydrins, 17.5 grams being the theoretical required. The dichlorohydrins so produced were extracted five times with a total of 5 liters of ethylene dichloride. The solvent was then evaporated off and the dichlorohydrins residue weighed 42 grams, representing a yield of 65%.

The above diallyl ether dichlorohydrins were dehydrochlorinated to the dioxide by stirring for 15 minutes at 20° C. with 200 milliliters of a 10% aqueous solution of sodium hydroxide. The dioxide was removed by extracting three times with a total of 3 liters of carbon tetrachloride. The solvent was evaporated and the residue distilled. A 63% yield (17 grams) of diallyl ether dioxide was obtained. This compound had a density of 1.1229 and a refractive index of 1.4452 at 23° C. Its molecular refractivity was calculated 30.89 and found 30.84; and the analyses: carbon calculated 55.4%, found 54.55%; hydrogen calculated 7.7%, found 7.63%. The boiling point of the purified material was found to be 86–87.5° C. at 5 mm. pressure.

Example 2

To 50 grams of diallyl ether monochlorohydrin, prepared by the interaction of epichlorohydrin and allyl alcohol and dispersed in 100 milliliters of a 25% aqueous solution of sulphuric acid, there was added 670 milliliters of a sodium hypochlorite solution, titrating 2.7% as hypochlorous acid, at 10° C. over a 20 minute period and with good stirring.

100 milliliters of a 35% aqueous solution of sodium hydroxide was afterwards added to the above mixture, and the stirring was continued at 15° C. for 15 minutes. The mixture was then extracted with carbon tetrachloride in a continuous extractor for 5 hours, after which time the carbon tetrachloride was evaporated off and the extract residue distilled at 70–90° C. under a 1.5 mm. pressure. 30.85 grams of diallyl ether dioxide was thus obtained, i. e., a 71% yield based on the weight of diallyl ether monochlorohydrin used.

Example 3

A dispersion of 50 grams of diallyl ether monochlorohydrin, prepared from epichlorohydrin and allyl alcohol, in 200 milliliters of a 10% aqueous solution of sulphuric acid was placed in a 2-liter flask, and 570 milliliters of a sodium hypochlorite solution, titrating 3.2% as hypochlorous acid, was added thereto at 10° C. over a 20 minute period with good stirring.

The above mixture was afterwards shaken for 15 minutes at 10° C. with 100 milliters of a 35% aqueous solution of sodium hydroxide. The mixture was then placed in a continuous extractor for 2 hours with carbon tetrachloride, after which time the solvent was evaporated from the extract and the residue of said extract distilled at 70–90° C. under a 1.0–1.5 mm. pressure. 17.4 grams of diallyl ether dioxide was thus isolated, i e., a 40% yield based on the weight of monochlorohydrin present in the reaction mixture.

Example 4

50 grams of diallyl ether monochlorohydrin, prepared by reacting epichlorohydrin with allyl alcohol, was dispersed in 200 milliliters of a 10% aqueous solution of sulphuric acid, and 365 milliliters of a sodium hypochlorite solution, titrating 4.0% as hypochlorous acid, was added thereto at 10° C. over a 20 minute period with continuous stirring.

100 milliliters of a 35% aqueous solution of sodium hydroxide was added to the above mixture and the stirring was continued at 15° C. for 20 minutes. The mixture was then transferred to a continuous extractor and therein treated with carbon tetrachloride for 4 hours. After evaporation of the carbon tetrachloride from the extract, the residue was distilled at 80–90° C. under a 1 mm. pressure thus liberating 25.2 grams of diallyl ether dioxide, i. e., a 58% yield based on the amount of diallyl ether monochlorohydrin used.

Example 5

To a dispersion of 50 grams of diallyl ether monochlorohydrin, obtained from epichlorohydrin and allyl alcohol, in 100 milliliters of a 20% aqueous solution of sulphuric acid, there was added 370 milliliters of a sodium hypochlorite solution, titrating 4.0% as hypochlorous acid, said addition being made at 10° C. over a 20 minute period and with continuous stirring of the dispersion.

The above mixture was then treated at 10° C. for 10 minutes with 200 milliliters of carbon tetrachloride and 100 milliliters of a 35% aqueous solution of sodium hydroxide. There was a formation of two layers at this stage. The non-aqueous layer was submitted to evaporation to remove carbon tetrachloride and the residue was distilled at 70–80° C. under a 1.5 mm. pressure to yield 6.1 grams of diallyl ether dioxide. The aqueous layer was re-extracted for 4 hours with carbon tetrachloride, and, after removal of carbon tetrachloride and distillation of the residue at 70–90° C. under a 1.0–1.5 mm. pressure, 14.2 grams of diallyl ether dioxide was isolated. There was thus obtained a total of 20.3 grams of diallyl ether dioxide, i. e., a 47% yield based on the weight of monochlorohydrin present in the reaction mixture.

Example 6

80 grams of chlorine was passed into 1 liter of a 9.5% aqueous solution of sodium hydroxide at 1° C., and the sodium hypochlorite solution thus obtained, titrating 5–6% as hypochlorous acid, was added at 15° C. over a 20 minute period to a dispersion of 150 grams of diallyl ether monochlorohydrin (obtained from epichlorohydrin and allyl alcohol) in 200 milliliters of a 16% aqueous solution of sulphuric acid. 920 milliliters of the hypochlorite solution was required before a positive test for hypochlorous acid was obtained in the reaction vessel.

200 milliliters of a 47% aqueous solution of sodium hydroxide was then added to the above mixture, which was stirred at 15° C. for 15 minutes. The mixture was afterwards extracted five times with a total of 5 liters of carbon tetrachloride, and, after removal of the solvent, the residue was distilled at 80–90° C. under a 1 mm. pressure. 72 grams of diallyl ether dioxide was thus obtained, i. e., a 55% yield based on the diallyl ether monochlorohydrin used.

Although other ratios may be used, it is preferred to use equimolar proportions of diallyl ether monochlorohydrins and hypochlorous acid in the practice of this invention.

The reaction of diallyl ether monochlorohydrins with hypochlorous acid may be performed in various ways other than those disclosed in the foregoing examples. For instance, there may be reacted a dispersion of monochlorohydrins in water with a solution containing hypochlorous acid. The same result would also be obtained by running an aqueous solution of a hypochlorite and a dilute mineral acid simultaneously into an aqueous dispersion of monochlorohydrins.

Although the above examples disclose hypochlorite solutions of a concentration 5–6% hypochlorous acid or lower, higher concentrations may be used. Likewise, the concentration of the sulphuric acid solution may be varied provided the acid is in a sufficient amount to liberate all the available hypochlorous acid from the hypochlorite.

Other hypochlorites than sodium hypochlorite may be used for the purposes of this invention. However, when it is desired to convert the dichlorohydrins to the dioxide, it is preferred not to use a hypochlorite containing a metal whose hydroxide is essentially insoluble in strongly alkaline solutions, because this may necessitate filtration of the final reaction mixture before the dioxide can be extracted.

Somewhat higher temperatures than 10–15° C. may be employed in the addition of the hypochlorite solution to the diallyl ether monochlorohydrins. It is preferred, however, to keep the temperature at 10° C. or lower, because better yields of products are obtained.

As disclosed in Example 1, ethylene dichloride is used to remove diallyl ether dichlorohydrins from the reaction mixture. However, other solvents, such as chloroform or ether, may be employed. In general, any solvent which is essentially insoluble in water and which will dissolve the dichlorohydrins without being attacked by them may be used.

As disclosed previously, diallyl ether dichlorohydrins may be used for the preparation of diallyl ether dioxide. They may also undergo various reactions to give other new and useful compounds.

It is apparent that many widely different embodiments of this invention can be made without departing from the spirit and scope thereof; and, therefore, it is not intended to be limited except as indicated in the appended claim.

I claim:

A process for the preparation of diallyl ether dichlorohydrins which comprises adding to a dispersion of diallyl ether monochlorohydrins in an aqueous solution of sulphuric acid having a sulphuric acid concentration of from 10% to 25% by weight an aqueous solution of sodium hypochlorite titrating from 2.7% to 6% as hypochlorous acid by weight, the molar ratio of sodium hypochlorite to diallyl ether monochlorohydrins being 1:1, at a temperature not in excess of 10° C., subsequently extracting the reaction mixture with a water-insoluble organic liquid which is a solvent for the resultant diallyl ether dichlorohydrins, and recovering said dichlorohydrins from said extract by evaporating said organic liquid.

OWEN CLEMENT
WENTWORTH ALLENBY.

REFERENCES CITED

The following references are of record in the file of this patent:

UNITED STATES PATENTS

| Number | Name | Date |
|---|---|---|
| 1,477,113 | Essex | Dec. 11, 1923 |
| 1,626,398 | Essex | Apr. 26, 1927 |
| 2,260,753 | Marple | Oct. 28, 1941 |

FOREIGN PATENTS

| Number | Country | Date |
|---|---|---|
| 556,038 | Great Britain | Sept. 17, 1943 |

OTHER REFERENCES

Pariselle: Comptes Rendus, vol. 150 (1910), page 1056.